United States Patent Office 3,738,804

Patented June 12, 1973

3,738,804

DYEABILITY OF MELT BLEND FIBERS WITH HIGH ELECTRON AFFINITY DYES

Orvill E. Snider, 1911 Coggin St., Petersburg, Va.; James E. Loughlin, 4230 Denbigh Drive, Charlotte, N.C.; and Hans Ortheil, Melody Lane, Rte. 8, Spartanburg, S.C.

No Drawing. Original application Nov. 13, 1967, Ser. No. 682,572. Divided and this application Apr. 8, 1971, Ser. No. 132,549

Int. Cl. D06p *3/82*

U.S. Cl. 8—15 2 Claims

ABSTRACT OF THE DISCLOSURE

Fibers are prepared which are comprised of 4–50 parts by weight of a substantially linear fiber-forming polyester having recurring cyclic structure in the polymer backbone dispersed in a continuous body of 50–96 parts by weight of a linear fiber-forming polyamide, said fiber having at least 5,000 polyester microfibrils per 1,000 square microns cross section and is dyed with an azo disperse dye having a solubility of less than 0.1 gram in 100 cc. of water and which has an apparent electron affinity of greater than 3 electron volts, said azo disperse dye having one or more electron attracting substituent moieties, and there may be simultaneously present electron repelling substituent moieties, provided the sum of the charges of the electron attracting moieties are at least 0.5 electron volt greater than the sum of the electron repelling moieties. The fibers may be blended with other fibers to form fabrics having novel effects.

A process for producing said dyed polyblend fibers or fabric therefrom comprising dyeing in an aqueous medium at a temperature of at least 150° F. as the sole fiber in the textile article or in combination with at least one other fiber selected from the group consisting of polyamide, polyester, polyacrylonitrile, polypropylene, cotton, silk and wool, said dye being solely an azo disperse dye having an electron affinity of at least 3.0 electron volts and alternately there may be simultaneously present, for multicolor effects, one or more dyes selected from the group, acid dyes, acid metallized dyes, direct dyes, basic dyes, and anthraquinone disperse dyes.

This is a division of application Ser. No. 682,572, filed Nov. 13, 1967, now U.S. Pat. 3,635,653.

BACKGROUND OF THE INVENTION

It is known that polyamides, particularly nylons such as nylon 6, and nylon 6,6, can be effectively dyed employing a wide range of dyestuffs. It is also known that polyesters can be dyed satisfactorily only with a limited range of dyestuffs, and in general with dyeing procedures substantially more elaborate than those employed with nylon. Thus, it would be expected that nylon/polyester melt blends would dye in relationship to their percentage composition someplace in between the strong dyeing of nylon and the weak dyeing of polyesters.

Unexpectedly it has been found that fibers made from dispersions of polyesters in polyamides, hereinafter referred to as PE–PA blends, absorb many acid dyes, dispersed dyes, and direct dyes at materially lower rates and concentrations than could have been postulated from the known concentrations of the dyestuffs present and the polyester content of the blend fiber employed.

Heretofore, it would have been predicted that the quality of dyeing achievable with such blends would depend upon the relative proportions of each ingredient in the blend, and that the quality would be poorer than that obtained with pure nylon. While these expectations have been substantiated with most dye classes, it has now been found that fibers prepared from such blends exhibit highly unusual dyeing characteristics with a certain class of dyes. More specifically, it has been found that these blends display a remarkable affinity for monoazo disperse dyes having a higher apparent electron affinity, that is, having substituents on the aromatic rings which have a high dipole moment and which are strongly electron attracting.

It has long been a problem in the dyeing of nylons to obtain tone-on-tone effects with sufficiently great contrast between the nylons to produce the desired design effects. One problem with nylon is that insufficient depths of dye shade, light fastness, and wash fastness are obtained with those dyes that give adequate leveling or uniform dyeing. It is still another problem with nylon that when nylons are dyed in multicolor with other fibers in a fabric in single or in multiple dye baths to produce a multicolored fabric in one operation, or successive operations, clear, bright multicolor effects normally are not obtained because of the strong affinity and similarity of nylon and their dyeing characteristics with most of the dye systems employed, making it quite difficult to obtain clear bright shades as are desired in most end-use applications of the multicolored fabric. Frequently such multicolor dyeings of fabrics show an undesirable "muddiness" of color.

SUMMARY OF THE INVENTION

In accordance with the present invention polyester/polyamide blend fibers are dyed with a dye selected from a group of disperse organic dyes which have a solubility in water of less than 0.1 gram per 100 cc. of water and said dyes being electron attracting and having an apparent electron affinity which is greater than 3.0 electron volts, said dyes being principally disperse azo type, said fiber comprising of substantially uniform dispersion of 4 to 50 parts by weight of polyester in a continuous body of 50 to 96 parts by weight of polyamide per 100 parts by weight of total polyamide and polyester wherein the polyester is comprised of a substantially linear fiber-forming polyester having recurring cyclic structure in the polymer backbone and having a reduced viscosity of about 0.3 to 1.1 deciliters per gram and the polyamide is comprised of a substantial linear fiber-forming polyamide having a reduced viscosity of about 0.6 to 1.3 deciliters per gram. The polyester is dispersed in the said polyamide in the form of discrete microfibers which occur at an average of at least 5,000 polyester microfibrils per 1,000 square microns in a drawn filament cross section.

It has been discovered that the PE–PA blends useful in this invention manifest several unusual properties in conjunction with high electron affinity azo disperse dyes; these are:

(1) The dyeing characteristics can be modified with change in the number of polyester fibrils in a given filamentary cross section.

(2) The improved dyeing characteristics are relatively insensitive to changes in pH.

(3) The dyeing characteristics vary with varying polyester content.

(4) The improved dyeing characteristics are obtained at temperatures below 100° C. and at atmospheric pressures.

The remarkable high affinity of electron attracting azo disperse dyes for PE–PA fiber blends is unexpected when the relatively poor affinity of these dyes for polyesters is considered at temperatures below 100° C. In view of the prior art it would not have been predicted, that by incorporation of polyesters in the polyamides, there would result a product having greater affinity for these classes of dyes with increasing polyester content. Thus, it is quite remarkable that it has now been found possible to produce novel dye products from polyamide/polyester blends with even better color characteristics than can be produced by dyeing the same products produced from the parent polyamide or polyester. This fact coupled with the unusual dyeing characteristics of the blend at temperatures below 100° C. and with respect to changes in pH and polyester content and with the number of polyester fibrils for a given cross section now makes it possible for the production of products exhibiting interesting useful and unusual dyeing effects which have not heretofore been possible.

The process of this invention is applicable to composite filamentary structures including yarns, cords, fibers and fabrics where at least one component of which is a filament obtained by melt spinning polyester/polyamide blend. It is applicable to fabrics from monofilaments, multifilaments, yarn, staple, continuous filament, and various crimped, bulked and textured yarn products made therefrom. In the simplest case, the structures to be dyed will be comprised of fibers derived from a polyester/polyamide blend containing a single proportion of polyester. In alternate cases there will be present fibers with varying proportions of polyester; and there will be present other fibers which will include nylon 6, nylon 6,6, nylon 7, nylon 8, nylon 11, nylon 12, and polyamide made by reaction of bis (para amino cyclohexyl) methane and aliphatic dibasic acids of C6–C16. The PE–PA blend fibers with or without another polyamide may be dyed in combination with one or more other fibers including natural and synthetic fibers such as polyesters, specifically polyethylene terephthalate, polyacrylonitrile, polyacrylics containing at least 80% polyacrylonitrile, cellulose acetate, cellulose triacetate, rayon viscose, and polyolefin fibers. Other natural fibers may be used in staple blend combinations or as individual fibers such as cotton, wool, and silk.

These fibers may be formed into fabrics by weaving, knitting, felting, carding, braiding, plaiting, spin-bonding, tufting, needling, etc.

The preferred polyester/polyamide blends useful in this invention comprise dispersions of polyesters and polyamides containing from about 4 to about 50 parts by weight of polyester in a continuous body of 50 to 96 parts by weight of polyamide per 100 parts by weight total polyester and polyamide. The polyesters in which the blends are prepared are substantially linear fiber-forming polyesters having recurring cyclic structures in the polymer backbone with reduced viscosity as measured at 25° C. in orthochlorphenol at a polymer concentration of .3 gram per 100 grams of orthochlorphenol of from about .3 to 1.1 deciliters per gram. This viscosity hereinafter is referred to as OCPR viscosity.

The polyamides employed in the blends useful in this invention are substantially linear fiber-forming polyamides having an OCPR viscosity of from about .6 to 1.3 deciliters per gram.

The blends are preferably prepared by melt blending suitable polyester polyamides in an extruder at a temperature of about 260 to about 285° C. at a shear rate of at least 100 reciprocal seconds and extruding through a spinneret at an apparent shear within the spinneret from about 2,000 to 32,000 reciprocal seconds. The terminal groups in the polymer, especially amine terminal groups in the polyamide may or may not be blocked, for example with mono- or dibasic acids.

The preferred polyesters are polyethylene terephthalate although others may be employed, more specifically those in which the recurring unit in the polyester chain is the diacyl aromatic radical from terephthalic acid, isophthalic acid, 5-T-butylisophthalate, or naphthalene dicarboxylic acids such as naphthalene-2,6- and naphthalene-2,7-dicarboxylic acids.

The preferred polyamides are polycaproamide or polyhexamethylene adipamide since these are most readily available commercially. Others which are prepared from polyamide forming monomers containing 4 to 14 carbon atoms can also be used, specifically nylon 7 (polyenanthoamide), nylon 8 (polycapryloamide), nylon 11 (polyundecylamide) and nylon 12 (polyaurylamide).

The nylon 7 exhibits dyeing characteristics very similar to nylon 6 and the nylon 8 exhibits dyeing characteristics very similar to nylon 6 and nylon 6,6. However, using nylon 11 and nylon 12, more stringent dyeing conditions are necessary and these exhibit comparatively low dye absorption and may be utilized, as an example, for higher degree of contrast between nylon 6 and 6,6 and as a degree of contrast between the polyblends.

Suitable blends are described more fully in U.S. patent application Ser. No. 368,028, filed May 18, 1964, now U.S. Pat. 3,369,057, assigned to the same assignee as this application.

The individual drawn filaments will typically have a thickness in the order of about 1 to 25 denier per filament and will have the characteristic structure comprising microfibers of the polyester dispersed in a substantially continuous body of polyamide. The size, configuration and distribution of the polyester microfibers will vary, depending upon the chemical and physical nature of the polyester and polyamide, the relative proportions of each, the blending and spinning conditions employed, the draw ratio, and any additional treatment of the fibers. In preferred embodiments of this invention the polyester microfibers will have an elongated configuration with the longest axis of the microfiber substantially parallel to the fiber axis. The average diameter of the microfibers in the drawn filamentary structure will be within the range of about 0.1 micron up to about .4 micron and preferably about .01 to .3 micron. The average microfiber length may be in the order of about 50 to 800 microns. The length to diameter ratio is desirable between about 150 and 40,000. The number of microfibers per 1,000 square microns of drawn filamentary cross section will typically be about 3,000 to 130,000 and preferably well above 5,000 polyester microfibers.

In accordance with certain of its aspects, the process of this invention for producing dyed fibers comprises dyeing a PE–PA melt blend fiber with an organic insoluble dye (solubility less than 0.1 gram per 100 cc. of water), the azo dye having an apparent electron affinity of greater than 3.0 electron volts, and said azo dyes employed have substituted thereon at least 1 or more groups of the electron attracting substituents consisting of nitro ($RNO_2$), an aldehyde (RCHO), an ester ($RCOOC_2H_5$), and halogens such as chlorine, bromine, fluorine and iodine (RCl, RBr, RI, RF) and aliphatic substituents R–$R_1$ and N or N,N′ substituted nitrogen moiety

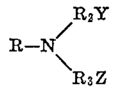

where R is one or more aromatic rings, $R_1$ is an aliphatic substituent moiety

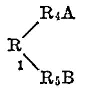

and $R_4$ and $R_5$ are independently selected from the substituent moieties H, and $(CH_2)_n$ and $n$ is an integer of 1–5 and A, B are terminal moieties selected from the group hydrogen (H), ketone ($COCH_3$), nitrile (C≡N) and hydroxyl (OH), and $R_2$ and $R_3$ are independently selected from the substituent moieties (H), $(CH_2)_{2n}$, where $n$ is an integer of 1–5 and Y and Z are independently selected from the terminal moieties, hydrogen (H), nitrile (C≡N), ketone (CO—$CH_3$), and hydroxyl (OH) provided one moiety, a nitrile C≡N, or ketone (CO—$CH_3$)

is always present. There may be simultaneously present on the ring, alone or in conjunction with other electron repelling groups such as dialkyl and aryl amines $[R—N(CH_3)_2]$,

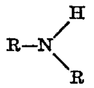

primary amines $[R—NH_2]$, hydroxyl [R—OH], alkyl and aryl ethers [ROR], $(R—O—COCH_3)$, methoxyl $[ROCH_3]$, and alkyl substituents $R(CH_2)_n$, where $n$ is an integer of 1–5 and is terminated with a hydrogen group. Also there may be present electron repelling groups which are secondary and tertiary amines; such as for example

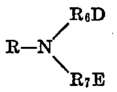

where $R_6$ and $R_7$ are independently selected from the substituent moieties H, $(CH_2)_n$ and $n$ is an integer of 1–5 and D and E are terminal substituents independently selected from the moieties hydrogen H, and OH; where R is one or more aromatic rings.

The above description of the substituent moieties requires that the sum of the electron attracting groups is at least 0.5 electron volt greater than the sum of the electron repelling groups.

The electron repelling groups tend to decrease the affinity of the azo dye for PE–PA blend fibers. However, when an electron repelling group and a strong electron attracting group are simultaneously present, there results an increase in the electron affinity of the electron attracting group, in a general manner to the change in the polar charges or dipole moment.

We have found that the maximum dye absorption occurs where there is simultaneously present on separate rings of a mono azo dye at least 1 or more aromatic substituent nitro groups, at least 1 aromatic or aliphatic C≡N substituent group and alternately an aromatic substituent moiety, a halogen, typically chlorine.

The description of the influence of electron attracting substituents and the electron releasing substituents on dipole moment is described on page 627 "Advanced Organic Chemistry" by Feiser and Feiser, Reinhold Publishing Company, 1961.

It is known that dipole moments are a complex vector function of the charge relationships and their distance in complex molecules such as azo dyes where multiple substitution of the aromatic ring occurs. However, we have now found that there is such a marked difference in dipole moments between the disperse dyes which have a strong affinity for the PE–PA blend fibers of this invention and the dipole moments of the azo disperse dyes which do not have a strong affinity for PE–PA melt blend fibers that an empirical electron affinity may be calculated which we hereinafter designate as an "apparent electron affinity." This apparent electron affinity is calculated by adding dipole moments of the electron attracting substituents on the same ring and subtracting the dipole moments for the electron releasing substituents as given by Feiser and Feiser in the above-cited reference, and by myth "Dielectric Behavior and Structure," McGraw & Hill, 1955, pages 260–311 and especially page 314, and pages 315–354.

The numerical dipole moments (for calculation of apparent electron affinity) for common substituents found on azo dyes are given in Table 1.

TABLE 1[1]

Values for calculating electron affinity dipole moments of monosubstituents

| Disubstituent (dipole moments) | Electron attracting unless otherwise stated | | | | | | | | | | | | Electron repelling unless otherwise stated | | | | | | | |
|---|---|---|---|---|---|---|---|---|---|---|---|---|---|---|---|---|---|---|---|---|
| | 3.97 $NO_2$ | 3.90 C≡N | 2.75 CHO | 2.93 $COCH_3$ | 1.56 Cl | 1.91 $COOCH_3$ | 1.53 Br | 1.50 I | 1.46 F | 3.50 $R_1C≡N$ | 1.85 $R_1Cl$ | 1.68 $R_1OH$ | 1.58 $N(CH_3)_2$ | 1.52 $NH_2$ | 1.61 OH | 1.52 $OCOCH_3$ | 1.16 $CH_3$ | 0.41 $CH_3$ | 1.16 $OC_6H_5$ | 1.3 N(H)—$C_6H_9$ |
| $CH_3$ ortho | 3.90 | [2] 3.7 | [2] 2.7 | [2] 2.9 | 1.41 | [2] 1.6 | 1.44 | 1.21 | 1.35 | [2] 3.7 | [2] 1.2 | [2] 1.6 | [2] 1.4 | 1.53 | [2] 1.4 | [2] 1.2 | 1.0 | .58 | [2] 1.0 | 1.1 |
| $CH_3$ meta | 4.14 | [2] 4.0 | [2] 2.9 | [2] 3.0 | 1.78 | [2] 1.8 | 1.75 | 1.58 | 1.85 | [2] 4.0 | [2] 1.5 | [2] 1.8 | 1.5 | [2] 1.6 | [2] 1.7 | [2] 1.6 | [2] 1.3 | .37 | [2] 1.5 | 1.4 |
| $CH_3$ para | 4.45 | 4.37 | 3.28 | [2] 3.1 | 1.94 | 2.05 | 1.96 | 1.71 | 1.82 | [2] 4.37 | [2] 1.7 | [2] 1.9 | 1.29 | 1.29 | 1.59 | [2] 1.4 | 1.20 | 0 | 1.44 | 1.2 |
| $NH_2$ ortho | 4.24 | [2] 4.1 | 3.0 | 3.2 | 1.77 | 2.1 | 1.77 | [2] 1.6 | [2] 1.5 | [2] 4.0 | [2] 1.9 | [3] .3 | [2] 1.6 | 1.45 | 1.1 | 1.0 | .91 | 1.53 | .8 | 1.0 |
| $NH_2$ meta | 4.94 | 4.74 | [2] 3.2 | 3.5 | [2] 2.3 | [2] 2.3 | [2] 2.3 | [2] 2.1 | [2] 2.0 | [2] 4.7 | [2] 2.5 | [3] .4 | [2] 1.9 | [2] 1.79 | 1.4 | 1.4 | [2] 1.2 | [2] 1.6 | 1.2 | 1.3 |
| $NH_2$ para | 6.2 | 5.96 | 3.7 | 3.8 | 2.93 | [2] 2.6 | 2.87 | 2.82 | 2.75 | [2] 5.9 | [2] 3.0 | [3] .5 | [2] 1.6 | 1.5 | 1.2 | 1.3 | 1.0 | 1.29 | .9 | 1.1 |
| $N(CH_2)_2$ ortho [2] | 6.6 | 5.8 | 4.1 | 3.9 | 1.9 | 2.3 | 2.0 | 1.9 | 1.8 | 5.6 | 2.0 | [3] .3 | [2] 1.5 | [2] 1.6 | [2] 1.2 | 1.1 | [2] 1.1 | [2] 1.4 | .9 | 1.1 |
| $N(CH_2)_2$ meta [2] | 5.9 | 5.1 | 4.0 | 4.1 | 2.6 | 2.5 | 2.7 | 2.6 | 2.5 | 5.0 | 2.7 | [3] .4 | [2] 1.7 | [2] 1.9 | [2] 1.5 | 1.5 | [2] 1.4 | 1.5 | [2] 1.1 | [2] 1.4 |
| $N(CH_2)_2$ para | 6.87 | 5.9 | 4.3 | [2] 4.5 | 3.29 | [2] 2.8 | 3.37 | 3.22 | 3.0 | [2] 5.9 | 3.1 | [3] .6 | 1.23 | [2] 1.6 | [2] 1.3 | 1.4 | [2] 1.2 | 1.29 | [2] 1.0 | [2] 1.2 |
| $OCH_3$ ortho [2] | 4.8 | 4.3 | 3.1 | 3.3 | 1.7 | 2.4 | 1.7 | 1.6 | 1.4 | 4.2 | 1.8 | .2 | [2] 1.1 | .91 | [2] .8 | 1.9 | [2] 1.1 | 1.0 | 1.1 | [2] 1.2 |
| $OCH_3$ meta [2] | 4.4 | 4.1 | 3.0 | 3.1 | 2.0 | 2.3 | 2.0 | 1.9 | 1.8 | 4.0 | 2.1 | .4 | [2] 1.4 | [2] 1.2 | 1.0 | [2] 1.2 | [2] 1.3 | [2] 1.3 | 1.4 | [2] 1.3 |
| $OCH_3$ para | 4.76 | [2] 4.4 | 3.2 | [2] 3.4 | 2.24 | 2.5 | 2.20 | 2.12 | 2.09 | [2] 4.3 | 2.4 | .6 | [2] 1.2 | 1.0 | [2] .9 | [2] 1.0 | 1.72 | 1.2 | 1.7 | [2] 1.1 |
| N—$(R_1)OH$ / $(R_1)CH_3$ ortho [2] | 4.9 | 4.7 | 3.6 | 3.7 | [2] 2.0 | 3.2 | 3.1 | 3.0 | 3.1 | 4.6 | 1.9 | [3] 1.2 | 1.1 | .9 | 1.1 | .7 | .8 | .7 | .6 | .9 |
| meta [2] | 4.1 | 3.9 | 3.3 | 3.5 | 2.2 | 3.0 | 2.9 | 2.8 | 2.9 | 3.8 | 2.2 | [3] 1.4 | 1.2 | 1.3 | 1.5 | 1.2 | 1.3 | 1.1 | 1.0 | 1.4 |
| para [2] | 5.0 | 4.8 | 3.7 | 3.9 | 2.5 | 3.3 | 3.2 | 3.1 | 3.2 | 4.7 | 2.4 | [3] 1.6 | 1.0 | 1.1 | 1.2 | .8 | .9 | .8 | .7 | 1.1 |
| | | | | | | | | | | | | | | | Electron attracting | | | | | |
| $NO_2$ ortho [1] | 6.0 | 4.8 | [2] 3.6 | [2] 4.1 | 4.1 | [2] 3.1 | 4.1 | 3.8 | 3.7 | [2] 4.6 | [2] 4.0 | 3.8 | [2] 6.6 | 6.0 | 4.9 | [2] 5.1 | 4.8 | 3.70 | [2] 4.3 | [2] 4.5 |
| $NO_2$ meta [1] | 3.89 | 4.2 | [2] 3.0 | [2] 3.7 | [2] 3.4 | [2] 2.6 | 3.4 | 3.3 | [2] 3.1 | [2] 4.3 | [2] 3.3 | [2] 3.4 | [2] 5.9 | 4.94 | 4.5 | [2] 4.0 | 4.4 | 4.14 | [2] 4.54 | [2] 4.8 |
| $NO_2$ para [1] | 0 | .5 | 2.41 | 2.6 | 2.5 | [2] 2.1 | 2.55 | 2.8 | 2.63 | [2] 3.0 | 2.6 | [2] 2.6 | 6.87 | 6.2 | 5.0 | [2] 4.8 | 4.76 | 4.45 | [2] 4.8 | [2] 5.0 |

See footnotes at end of table.

TABLE I—Continued

| Disubstituent (dipole moments) | Values for calculating electron affinity dipole moments of monosubstituents | | | | | | | | | | | | | | | | | | | |
|---|---|---|---|---|---|---|---|---|---|---|---|---|---|---|---|---|---|---|---|---|
| | Electron attracting unless otherwise stated | | | | | | | | | | | | Electron repelling unless otherwise stated | | | | | | | |
| | 3.97 $NO_2$ | 3.90 C≡N | 2.75 CHO | 2.93 $COCH_3$ | 1.56 Cl | 1.91 $COOCH_3$ | 1.53 Br | 1.50 I | 1.46 F | 3.50 $R_1C≡N$ | 1.85 $R_1Cl$ | 1.68 $R_1OH$ | 1.58 $N(CH_3)_2$ | 1.52 $NH_2$ | 1.61 OH | 1.52 $OCOCH_3$ | 1.16 $CH_3$ | 0.41 $CH_3$ | 1.16 $OC_6H_5$ | 1.3 N(H)—$C_6H_5$ |
| N—$(R_1)C≡N$ / $(R_1)CH_3$ ortho [1] [2] | 5.5 | 5.4 | 3.4 | 3.6 | 4.2 | 3.1 | 3.1 | 3.0 | 3.6 | 3.9 | 4.3 | 5.0 | 6.7 | 6.7 | 6.9 | 6.3 | 5.6 | 4.7 | 5.5 | 5.7 |
| meta [1] [2] | 4.8 | 5.0 | 2.7 | 2.9 | 3.5 | 3.7 | 3.7 | 3.6 | 3.0 | 5.2 | 3.6 | 4.8 | 6.1 | 6.0 | 6.3 | 6.1 | 5.4 | 4.5 | 5.3 | 5.5 |
| para [1] [2] | 4.4 | 3.8 | 2.5 | 2.7 | 2.6 | 2.8 | 2.8 | 2.7 | 2.5 | 2.0 | 2.7 | 3.0 | 7.0 | 6.9 | 6.6 | 6.5 | 5.8 | 4.9 | 5.7 | 5.9 |
| CL ortho [1] | 4.1 | [2] 4.2 | 3.4 | [2] 3.6 | 2.27 | 2.6 | [2] 2.2 | [2] 2.1 | 2.38 | [2] 4.1 | 2.3 | 2.4 | 1.9 | 1.77 | 1.8 | [2] 1.6 | [2] 1.7 | 1.41 | [2] 1.6 | [2] 1.8 |
| CL meta [1] | 3.4 | [2] 3.5 | [2] 2.9 | [2] 2.5 | 1.48 | [2] 2.4 | 1.48 | 1.4 | 1.3 | [2] 3.4 | 1.5 | 2.2 | 2.6 | 2.3 | 2.4 | [2] 2.2 | 2.0 | 1.78 | [2] 2.1 | [2] 2.2 |
| CL para [1] | 2.5 | 2.56 | 2.03 | 2.29 | 0 | 2.1 | 0 | .5 | 0 | [2] 2.4 | .5 | 2.0 | 3.29 | 2.93 | 2.27 | 2.7 | 2.24 | 1.94 | [2] 2.3 | [2] 2.4 |
| | | | | | | | | | | | | | | | Electron repelling | | | | | |
| Self ortho | 6.0 | 5.0 | 3.5 | 2.8 | 2.27 | 2.2 | 2.1 | 1.7 | 2.38 | 4.9 | 2.4 | 1.8 | [2] 1.5 | 1.45 | [2] 1.3 | 1.4 | [2] 1.1 | .58 | [2] .9 | 1.2 |
| Self meta | 3.89 | 3.8 | 2.4 | 2.5 | 1.48 | [2] 1.7 | 1.46 | 1.27 | .37 | 3.7 | 1.6 | 1.2 | [2] 1.7 | 1.79 | [2] 1.6 | 1.5 | [2] 1.3 | .37 | [2] 1.1 | 1.4 |
| Self para | 0 | 0 | 2.35 | 2.71 | 0 | 0 | 0 | 0 | 0 | .6 | 0 | 0 | 1.23 | 1.5 | 1.4 | 1.6 | 1.72 | 0 | .3 | .4 |

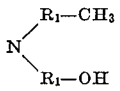
=.97 repelling, approximate value.

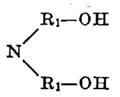
=1.8 repelling, approximate value.

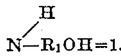
=1.0 repelling, approximate value.

[1] These values are electron attracting under the electron repelling column. All other values are electron repelling or attracting as specified under their column designation unless otherwise indicated. The dipole moments are a complex vector function expressed in Debye units. Such a value is a practical method of expressing the affinity or attraction forces between a dye and the polyblend fibers of this instant invention—S. Glasstone Textbook of Physical Chemistry, 2nd edition Reprint 1954 von Nostrand Company, Inc., on page 411 has defined the electron affinity of halogens, Br, Cl, and I in kilo calories and further states that this is more commonly expressed as electron volts with conversion between kilo calories and electron volts given as 23.05 kilo calories equals 1 electron volt. In conversion of the geometric vector Debye dipole moments to electron volts, the same values are approximately 2.4 to 2.7 times the dipole moment. For purposes of simplification we have retained the dipole moments as the basic numerical values, and have designated these values as apparent electron affinity in electron volts. A more accurate value for an electron volt value may be calculated by the approximation of 2.5 times that of the apparent electron affinity values cited in this instant invention.

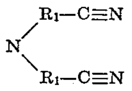
=5.0 approximate value electron attracting.

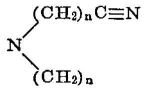
=5.08 approximate value, electron attracting.

[2] Approximate values, all others measured values in benzene. $R_1$=Aliphatic substituents of $(CH_2)_n$ where $n$ is an integer of 1-5.

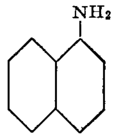
=1.49 electron repelling.

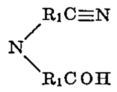
=4.68 electron attracting.

[3] Estimated approximate values, electron repelling.

The best correlation with dye strength is obtained where the apparent electron affinity charges of 2 aromatic rings of the disperse azo dye molecules are totaled. All disperse azo dyes investigated which contain only electron repelling substituents give reduced dye affinity with PE–PA melt blend fibers employed in this invention as compared to the dye affinity for nylon. It is postulated that the excellent dye strength and light fastness properties of the PE–PA fibers of this invention for azo dyes as compared with nylon are due in large part to the electron attracting forces of the dyes used and the unexpected tendency of the PE–PA melt blend fibers to donate or share electrons.

In the dyeing of polyblends typically disperse azo dyes which have special affinity for the PE–PA blend fibers are those which contain at least 2 substituent groups, simultaneously present on one or more aromatic rings, selected from the group of substituents consisting of R—C≡N, $R(CH_2)_nC≡N$, R—$NO_2$, a R—X and R—$(CH_2)_nX$, where R is an aromatic ring, X is a halogen, e.g. chlorine, bromine, iodine or fluorine and $n$ is an integer of from 1-5. To illustrate the difference in nylon dyeings and the polyblends of this invention with azo disperse dyes, the polyblend fiber properties as illustrated in Table 3 may be compared with a nylon 6 control fiber. The nylon 6 control fiber had 49 carboxyl end groups per kilogram of polymer and 48 amine groups per kilogram of polymer. A 30% polyester 70% polyamide blend fiber whose properties are also designated in Table 3 was dyed competitively in the same bath. Both fibers were scoured with .2% Naccanol SL and .2% soda ash for 10 minutes at 85° C., prior to dyeing. The .2% refers to percent scouring agent by weight of fabric.

The materials were dyed in the same dye bath under identical conditions using .25% by weight of the indicated dye and .1% Triton X100, an alkylaryl polyether-alcohol surfactant and the dyeing was carried out at a pH of 7.0 by raising the temperature over 30 minutes to 95° C. and holding at 95° C. for 45 minutes. The results of these dyeings are shown below in Table 2.

TABLE 2

| Assigned Color No. | Dye color in PE-PA blends | Color Index code[1] | Formula or color index title | Apparent electron affinity | Measured dye strength vs. Nylon 6 | Dye strength from Figure 1 |
|---|---|---|---|---|---|---|
| 101X | Burnt orange | | 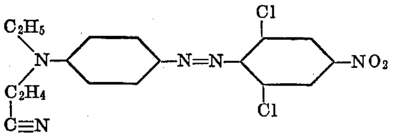 | 9.9 | 180 | 177 |
| 102X | Brown | | 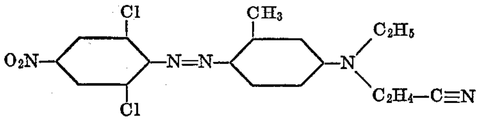 | 9.56 | 170 | 127 |
| | Scarlet | 11230 | 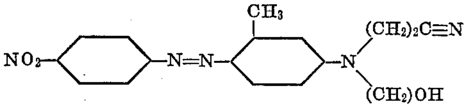 | 9.08 | | 165 |
| 103X | Brownish red | | 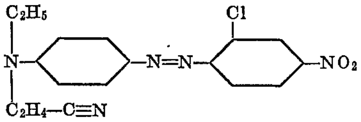 | 8.48 | 160 | 159 |
| | Yellow | 11310 | 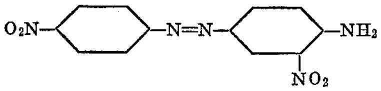 | 8.21 | 145 | 156 |
| 106X | Orange | | 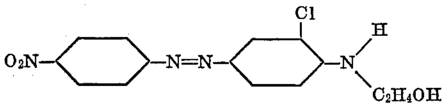 | 5.97 | 110 | 128 |
| | Blue | 11420 | 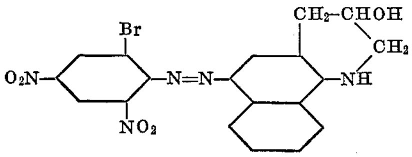 | 5.3 | 130 | 120 |
| | Orange | 11100 | Disperse Orange 5 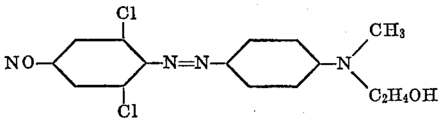 | 3.88 | 105 | 104 |
| | Red | Disperse Red 32 11190. | 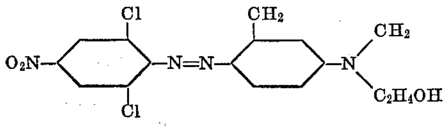 | 3.78 | | 101 |
| | Red | 11110 | Disperse Red I 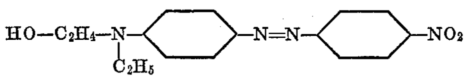 | 3.0 | 90 | 92 |
| 107X | Bright scarlet red. | | 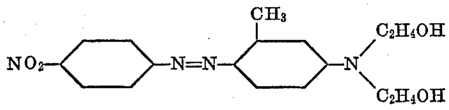 | 3.0 | 85 | 92 |
| | Oran e | 11005 | Disperse Orange 3 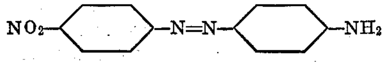 | 2.45 | 85 | 85 |

See footnote at end of table.

TABLE 2—Continued

| Assigned Color No. | Dye color in PE-PA blends | Color Index code [1] | Formula or color index title | Apparent electron affinity | Measured dye strength vs. Nylon 6 | Dye strength from Figure 1 |
|---|---|---|---|---|---|---|
| | Red | 11150 | Disperse Red 7 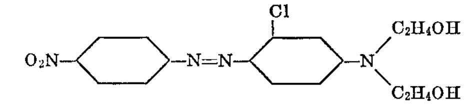 | 6.37 | 130 | 132 |
| 105X | Yellow | Disperse yellow 23. | 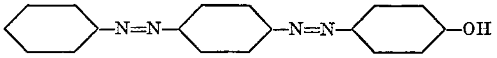 | [2] 2.0 | 80 | 80 |
| 104X | Blue-black | Disperse black 3. | 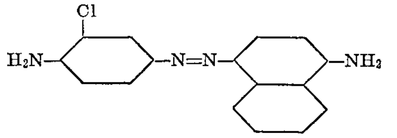 | 0.28 | 60 | 58 |

[1] Volume 3, 2nd Edition 1956 "Colour Index" joint publication, Soc. Dyers and Colourists and American Assoc. Textile Chemists and Colorists.

[2] A second azo group attached to a mono azo group has an electron attracting affinity of 3.6.

The dye strength is an observation of the color strength of the dyed fibers versus the standard nylon 6 control fiber, the evaluation being carried out under a MacBeth lamp. A change of 10% in fiber dye strength is visually distinct to an ordinary observer and is approximately equal to a change of 10% in the amount of dyestuff added to the bath.

It can be observed that all of the azo dyes having an electron affinity greater than 3.0, when used in dyeing polyblends, exhibit a dyeing strength equal to or superior to nylon 6 in competitive dyeing.

This increase in dyeability over nylon 6 is unexpected when it would have been predicted that nylon 6 containing polyester would have dyed with significantly lower dye strength than the parent control nylon. To illustrate this a polyester fiber dyed in a similar manner exhibited very light staining of between 5 and 10% dye strength of the nylon control. Specifically, color 101X gave a dye strength of 5% for polyester, for a nylon 6 a dye strength of 100%, and for 30% polyester content polyester/polyamide blend, a dye strength of 180%. Dye color number 102X gave a dye strength of 10% for a polyester fiber (polyethylene terephthalate), 100% for the nylon 6 control and 170% for the polyester/polyamide blend. This dye has an electron affinity of 9.53. Dye color number 103X gave a polyester fiber dye strength of 15%, a nylon dye strength of 100% and a polyester/polyamide blend fiber dye strength of 160%.

More significant still, the polyblend yarns exhibited a considerably improved light fastness as compared with the nylon control yarns when dyed under identical circumstances.

In carrying out this invention, the fibers may be dyed employing conventional techniques and commercial dyeing equipment. Low pressure may be used as well as high-pressure, high-temperature equipment.

Conventional dye auxiliaries such as wetting agents, emulsifying agents, carriers, sequestrants, swelling agents, developers, protective colloids, stabilizers, and the like may be used. It is preferred to utilize non-ionic or weak anionic surfactants such as alkyl aryl polyether alcohols. Condensates of ethylene oxides with long-chain alcohols and polyoxyethylene surfactants are especially useful. Cationic surfactants can be employed if the azo dyestuff has not been previously dispersed by the manufacturer using anionic surfactants. If anionic surfactants have been employed by the manufacturer of the disperse azo dye, agglomeration of the dye may occur if cationic surfactants are used during dyeing.

While carriers such as benzyl alcohol and the like can be employed, it is especially advantageous of this invention that they can easily be omitted while still obtaining deep shades and short dye cycles. The disperse dyes are applied in the form of a fine, typically colloidal, suspension of the dye in an aqueous medium. Such suspensions are generally prepared by grinding the dye in a colloid mill and the like in the presence of a suspension of dispersing agent such as Naccatan A which is a sodium salt of a sulfonated naphthalene condensation product.

The dye concentration by weight of fabric would generally be in the order of about 0.1 to 0.5% for light shades in apparel wear and 0.5 to 2.0% for outer wear; for medium shades 0.5 to 1% for apparel wear and 1 to 2% for medium to dark shades on outer wear. For heavy shades 1 to 2% for undergarments and 1½ to 4% for outer wear dark shades.

All percentages are expressed as percent by fabric weight of dyestuff employed. The dyeing is typically carried out at elevated temperatures of at least 70° C. and more preferably from 90 to 98° C.

The preferred operating temperatures may vary with particular dyes. The dyeing times will vary depending upon the nature of the dye, the fabric construction, the dye concentration, the temperature, and the dye apparatus employed. Typical dyeing times will be in the order of about 0.5 to 9.0 hours.

The optimum temperature for the preparation of particular products will vary with the dye and with the blend employed. This can be determined by testing a series of dyes over a range of temperatures. In general, it may be said that the maximum rate of dye absorption and improved dye leveliness is obtained at the higher dye temperatures, specifically those from 90 to 100° C.

In general, the novel dyeing process of this invention is particularly insensitive to change in pH in the range of 3 to 10½ pH. A pH of less than 3 is generally avoided because at this low pH and at the temperatures employed in the dyeing process, chemical attack on the fiber may occur. In the dyeing of carpets it may be necessary to dye at as high a pH as 10.0 in order to avoid undue discoloration from the jute-backing. It is an advantage that the disperse dyes of this invention have excellent affinity for the polyester/polyamide blend fibers whereas typical nylon fibers tend to become stripped at these higher pH levels.

We have now found unexpectedly that it is possible to produce an improved wide range of colors and to considerably expand the dye effects possible in fabrics employing PE–PA blends and disperse dyes having a high apparent electron affinity for the polyblends. It is possible for instance to use various polyester-polyamide blend fibers and to show tone-on-tone dye color effects (a substantial shade difference). Polyblend fibers having from 4 to 50% polyester concentration, can be used with or without a monoazo dye having a high electron dye affinity to show substantial shade difference. If a nylon 6 fiber having greater than 40 amine equivalents is added to the fabric, another shade difference is possible. If nylon 6,6 is added which has approximately 30 to 40 amine equivalents, a further shade differential can be obtained. If for instance a nylon 6 is employed which contains less than 30 milliequivalents per kilogram of terminal amine groups a different shade is also obtained. These differences are less apparent in the disperse dyes. Thus, in the simplest form, this invention can be applied to fibers prepared from polyester/polyamide filaments containing different proportions of polyester to obtain a plurality of shades from only 1 dye in 1 dye bath. By adding 2 dyes, one an acid dye and the other a disperse dye of similar shades, the contrasting colors can be accentuated, particularly the color difference between the PE–PA blend fibers of this invention and nylons. Indeed with many of the disperse dyes having particularly high affinity for the PE–PA blend fibers there is sufficient difference of color so that there is a complete color change, nylon 6 being a light tan color with dye color number 101X and the PE–PA blend fiber (30% polyester 70% nylon) being a deep burnt orange color. When color number 102X is employed, the PE–PA blend fiber is a reddish brown color while nylon 6 dyes a scarlet color. With color number 103X, 30/70 PE–PA melt blend fiber dyes a deep scarlet whereas nylon 6 dyes a light pink color.

Thus, by selecting a series of acid dyes or acid metallized dyes of similar shades, these color differences can be emphasized or alternately leveled so that they are dyed identical within a single fabric structure. In most cases it is desired to have substantial shade differences, therefore it is a special advantage of this invention that a wide variety of shade differences can be obtained using single or multiple dyes within a dye bath. By adding other fibers such as polyester and a fiber with at least 80% polyacrylonitrile or polyolefin fibers or by adding natural fibers such as cotton, wool, these shade differences can be further accentuated and novel pattern fabrics can be produced using a woven structure and dyeing it in a single bath. Still another aspect of this invention resides in the fact that by taking advantage of the novel affinity of the PE–PA blend fibers, then adding dyes of different colors having different affinities for the PE–PA blend fibers, and adding a nylon fiber plus other synthetics, a knitted or woven fabric can be produced and dyed in a dye bath with different colors whereby a wide range of colors can be produced in the woven fabric in a single operation. Also, by selection of various dyes, various dye concentrations, various pH levels, various polyester/polyamide fibers having various polyester contents a wide variety of new and useful products can be produced.

Polyester/polyamide fibers dyed in accordance with this invention are characterized by very deep, brilliant shades, brightness and singularly outstanding light fastness with azo disperse dyes of high electron affinity and have relatively good wash fastness and good resistance to crocking. Because of these desirable attributes, fabrics of outstanding color and multi-color or tone-on-tone effects with a crisp, clear and bright appearance can be obtained. The finished goods constructed from nylon yarn are useful for apparel fabrics as well as decorative fabrics such as draperies, rugs, slip covers, upholstery, etc., because of its remarkable affinity for most dyes employed, and particularly, between different nylons in which case it is quite difficult to obtain substantially different colors. We have however found that the PE–PA blends of this invention yield very bright colors clearly defined from the polyamides employed. This is often impossible with nylon fabrics incorporating other fibers, of natural or synthetic fibers, since nylon heavily cross dyes with many classes of dyes used. We have found that by weaving or knitting various yarns and using dyeing processes as disclosed in this invention that fabrics can be produced which have multi-colors or tone-on-tone shades that follow the characteristic of the particular fiber introduced. By using, for instance, a box weave pattern and selecting dye combinations, attractive patterns can be incorporated in the fabric so that rugs, upholstery fabric, knitted goods, and the like can be dyed in mass in a series of colors and/or in tone-on-tone effects hitherto impossible to achieve with nylon alone.

We have found in the process of this invention that it is possible to substantially modify the PE–PA blend fiber and that the stylist and the dyer can now produce dyed fabrics with greater differences than has been possible in the past. They can extend the range of dyes which can be employed for the novel dye effects and because of the remarkable affinity of the PE–PA blend fibers of this invention, the resultant dyed products have unique and outstanding dye fastness properties as compared with nylon alone. Among the methods which may be employed to modify the fibers of this invention and the process parameters which may be used to modify the color effect of the process of this invention are the following:

(1) Selection of different PE–PA blend fibers having different polyester concentrations.

(2) Selection of PE–PA blend fibers wherein different shear effects have been carried out to produce a greater number of polyester fibrils for a given filamentary cross section, with the greater dye strength being obtained with fibers having greater number of polyester fibrils per unit cross section for a given polyester concentration.

(3) Selection of critical concentrations of dye to emphasize the shade differences between nylons.

(4) Selection of different dye types, that is a deep dyeing, high electron affinity disperse azo dye for the polyester/polyamide blend fiber and an acid dye of similar shades for the polyamide fiber. This along with critical selection of concentration of the dyes employed, results in unusual color effects.

(5) Because of the relative insensitivity of the PE–PA blend fibers to changing pH with acid dyes, and since the dye affinity of nylons can be materially changed for the acid dyes with change in pH, a change in the dye contrast between the nylon and the polyester/polyamide blend fiber employed can be obtained.

(6) By use of an electrolyte such as NaCl and KCl to decrease the solubility of acid azo dyes having typically in the absence of the acid group a high electron affinity, the acid dyes or acid metallized azo dyes tend to act as disperse dyes and take on the character of their parent disperse dye types. In this manner the PE–PA blend fibers tend to selectively increase their dye strength at a greater rate than does nylon fibers given a similar treatment in the same dye bath.

(7) By use of colorless mono, di, or trisulfonic acids to selectively block the amine end groups of the nylon 6 or 6,6 components thereby decreasing their dye absorption in the presence of acid dyes without materially affecting the dye absorption in the PE–PA blend fibers.

(8) By selection of nylon having different terminal amine end groups, the percentage absorption of acid dyes and acid metallized dyes can be materially altered.

In Table 3 which follows, the effects of spinneret shear upon the relative ability of the PE–PA blend fibers to absorb high electron affinity azo dyestuffs is illustrated. In this case a 30% polyester polyamide blend fiber is employed and the change in dye strength is noted as compared to a controlled nylon polycaproamide fiber having a dye strength of 100%. A 0.25% dye by weight of fiber was employed and the fibers were dyed in a manner described for Table 2.

The dye type employed was 102X. A similar effect of increasing dye strength is noted using lower polyester concentrations, say 10%, or higher polyester concentrations, say 50%, with the effect of increasing number of polyester numbers per given filamentary cross section being emphasized with the increased polyester concentration. Thus the effects of increasing the shear within the spinneret is more marked at the higher polyester concentrations than at the lower polyester concentrations.

Definitions and Tests: In the course of the previous description and following examples, the following tests and definitions are used to define more fully the process and technology employed.

Dye strength: The dye strength of the fibers is rated under a MacBeth lamp by an experienced colorist. A control polycaproamide having greater than 40 milliequivalents of amine end groups per kilogram of polymer is normally employed and is rated at 100% when dyed competitively with the fiber being compared with it. Thus a dye strength of 110% for 1% by weight of fabric for standard dyeing is equal to that obtained when dyed with 1.1% dye per weight of fabric. Similarly a 0.5% dyeing per weight of fabric rated as a dye strength of 110% is equal to a dyeing of the standard with 0.55% dye per weight of fabric.

Reduced viscosity: The reduced viscosity of polyesters and polyamides as employed in this specification was determined by viscosity measurements carried out on a sample of polymer dissolved in purified orthochlorphenol containing 0.1% water, and maintained at a temperature of 25° C. and a polymer concentration of 0.5% during the determination and is expressed as deciliters per gram.

TABLE 3

| Shear within the spinneret in reciprocal seconds | Dye strength—30% polyester, 70% nylon melt blend | Number of[1] polyester fibrils per 1,000 $\mu^2$ filament cross section |
|---|---|---|
| 1,725 | 100 | 2,840 |
| 2,300 | 135 | 6,450 |
| 6,350 | 160 | 20,000 |
| 13,900 | 170 | 31,000 |
| 20,000 | 175 | 47,000 |
| 30,000 | 180 | >55,000 |

[1] Apparent Electron affinity 9.56.

Disperse dye used color identity number and formula:

(102X, Dye) 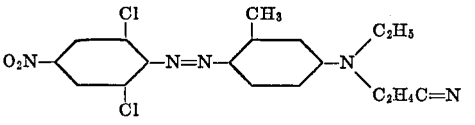

.25% by fabric weight dyed at pH of 7.0.

The apparent mixing shear within the extruder is expressed in reciprocal seconds and it equals $$\pi\frac{\text{(diameter of screw in inches) (revolutions per second)}}{\text{thread height in metering sections}}$$

*The apparent shear in reciprocal seconds:* This is calculated from the equation $$\left(\frac{4q}{\pi R^3}\right)$$

where $q$=volumetric flow per second or blend throughput in pounds per second divided by density in pound per cubic foot. $R^3$ equals the radius of the spinneret hole in feet cubed. The apparent shear at the spinneret is based on one spinneret hole. Thus shear values obtained are divided by the number of spinneret holes used for the total flow employed. The following are the densities of molten materials for this calculation:

TABLE 4

| Polycaproamide, percent | Percent polyethylene terephthalate | Density in grams per milliliter as determined at 270° C. |
|---|---|---|
| 100 | | 1.01 |
| 90 | 10 | 1.03 |
| | 100 | 1.21 |
| 80 | 20 | 1.05 |
| 70 | 30 | 1.07 |
| 60 | 40 | 1.09 |
| 50 | 50 | 1.11 |

PREFERRED EMBODIMENTS

The examples given below illustrate the practice of certain specific embodiments of the invention. It will be understood however that the invention is not limited to the specific embodiments herein disclosed, but includes all modifications and variations thereof which are apparent to those skilled in the art.

Examples 1 through 38

The polyester/polyamide blend fibers were prepared by blending together particles of polyethylene terephthalate having a reduced viscosity of at least .3 deciliter per gram and the polycaproamide having reduced viscosity of at least .6 deciliter per gram, and extruded at a temperature of 265 to 277° C. and apparent shear of at least 110 reciprocal seconds within the extruder and in these examples 115 reciprocal seconds. The filaments were produced by extruding the molten polymer in blend at an apparent shear within the spinneret of at least greater than 2,100 reciprocal seconds and in most of these examples greater than 6,000 reciprocal seconds.

The spun filaments were then passed through a quench zone and taken up as yarn at a birefringence of less than .0055. It was then drawn at a speed of 840 feet per minute at the noted draw ratio. Drawn yarns were conditioned for 24 hours at 25° C. and at a relative humidity of 65% before the physical properties which are cited herein were determined.

Dyeing is carried out using the noted dye concentrations (expressed as percent dye based on the total fiber weight). The percent dye in the dye bath is nominally 1.0% by weight of the fiber tested. To achieve the improvement in dyeing over nylon, the PE–PA blends must have, in the drawn state, at least 5,000 polyester microfibrils per 1,000 square micron filamentary cross section. The polyester fibers should not have a drawn diameter which exceeds .3 micron and the polyester fibrils should have a length which is preferably at least 300 times polyester diameter.

In Examples 1–20, the polyblend melt blend fiber was prepared by admixing 10, 30, and 40% polyester (polyethylene terephthalate in an extruder at an apparent shear of 115 reciprocal seconds at a temperature of 265° C., the polymer being dried to a moisture content below .05% prior to blending. The molten polymer upon exiting from the extruder passes through a pump, thence through suitable filtration medium involving a sand pack wherein a suitable velocity was maintained above 40 reciprocal seconds) to avoid agglomeration and growth of the polyester dispersed spheres.

Upon exiting from a sand pack, the polymer passed through a 20 hole spinneret at an apparent shear within the spinneret of 6,300 reciprocal seconds. The polymer feed rate was 3.8 pounds per hour or .19 pound per hour per spinneret hole. The yarn was then passed through a quench zone and taken up in a conventional manner.

Yarn was subsequently drawn at the indicated draw ratios and test portion was crimped using a stuffer box crimper to produce crimped yarns having 13.0 crimps per inch. Non-crimped yarns were wound up on packages to produce 120 denier, 20 filament yarn, and was subsequently twisted to have ⅓ turn per inch.

In preparation of the dye dispersion, the dyes were pasted with water and 0.5%, based on the weight of the fiber of an alkyl aryl polyester alcohol surfactant. Dyeing was carried out at a temperature of 95° C. for one hour at a pH as indicated utilizing dyes and jointly dyeing the polyblend fibers of various percentage polyester concentration with the polyamides under the conditions as outlined in Table 6. The properties of the fibers conform to that as illustrated in Table 5. The dye descriptions are as outlined in Table 2. The relative percent dye absorbed is as described above.

The dye bath, a pH was adjusted by addition of acetic acid for pH below 4½ and ammonium sulfate for attainment of a pH of 4.5. For attainment of pH above 7 a dilute solution of sodium hydroxide was added to attain the desired pH.

In Tables 6 and 7 in subsequent examples the following definitions apply to identify the class of dyes employed.

Class 1, acid soluble dyes, anthraquinone type.

Class 2, acid dyes generally azo type.

Class 3, direct dye, soluble type.

Class 4, disperse dye, generally a disperse anthraquinone type.

Class 5, soluble metallized acid dye, 2 molecules of dye to 1 atom of metal, generally neutral dyes of 6.5 to 9.0 pH and the metal atom is generally either chrome or cobalt.

Class 6, disperse dye, azo type insoluble having a low electron affinity of below 3.0.

Class 7, soluble metallized dye, 1 atom of metal to 1 molecule of soluble acid dye. The metal is generally chrome and the dyeings are generally on the acid side at 4.0 to 6.0 pH.

Class 8, a basic dye.

Class 9, a dispersed dye, azo type, water insoluble, less than .1 gram per 100 cc. of water and which has an apparent electron affinity of greater than 3.0.

The 120 denier, 20 filament, 1/2Z twist yarn was knitted on a circular knitter into 2-inch wide bands so that each fiber when dyed was as distinct as a 2-inch band. The knitted sleeve were scoured with 0.2% Naccanol SL, detergent and 0.2% sodium carbonate and were dyed in the processes indicated above.

Each 2-inch band contained 1 fiber; a polyhexamethylene adipamide, a nylon 6,6 fiber; a polycaproamide fiber having greater than 40 milliequivalents of terminal amines per kilogram of polymer; a second nylon 6 fiber having less than 20 milliequivalents per kilogram of polymer of terminal amines; a 10% polyester, 90% polyamide blend; a 30% polyester, 70% polyamide blend, and a 40% polyester, 60% polyamide blend. In Table 6 below, the effects of pH and other process factors upon dye strength and dye shade can be seen.

TABLE 5

| Polymer properties | Nylon 6,6, control | Nylon 6, control | Nylon 6, terminated | 30% polyester, 70% polyamide | 40% polyester, 60% polyamide | 10% polyester, 90% polyamide |
|---|---|---|---|---|---|---|
| End groups as carboxyl [1] | 106 | 60 | 66 | 75 | 75 | 75 |
| End groups as amines [1] | 27 | 45 | 9 | 6 | 6 | 6 |
| Polyester phase: | | | | | | |
| End groups as carboxyl [1] | | | | 55 | 55 | 55 |
| End groups as hydroxyl [1] | | | | 56 | 56 | 56 |
| Polyester OCPR viscosity | | | | 0.8 | 0.8 | 0.8 |
| Nylon OCPR viscosity | .89 | 1.11 | 1.21 | 1.055 | 1.055 | 1.055 |
| Spinning conditions, temperature spun, ° C | 275 | 265 | 270 | 270 | 268 | 270 |
| Extruder mixing shear, reciprocal seconds | 68 | 72 | 60 | 115 | 116 | 110 |
| Mixing shear within spinnerette, reciprocal secs | 2,530 | 2,530 | 2,530 | 6,350 | 6,120 | 6,500 |
| Temperature of drawing, ° C | 185 | 185 | 185 | 185 | 185 | 185 |
| Draw ratio | 4.2 | 4.1 | 4.2 | 4.4 | 4.3 | 5.2 |
| Drawn diameter PE fibril μ | | | | .138 | .193 | .04 |
| Drawn PE fibril length/dia | | | | 1,670 | 1,000 | 5,160 |
| Number of PE fibril/1,000μ [2] | | | | 20,000 | 14,100 | 65,000 |
| Ultimate tensile strength | 4.4 | 4.8 | 4.3 | 7.2 | 7.0 | 7.1 |
| Ultimate elongation | 28 | 31 | 32 | 26 | 23 | 17 |
| Stiffness index, UTS/UE | .16 | .15 | .134 | .28 | .305 | .417 |
| Initial tensile modulus, g.p.d | 22 | 25 | 34 | 58 | 65 | 52 |
| Hot-wet strength, g.p.d | 2.8 | 3.1 | (2) | 4.9 | 4.9 | |
| Hot-wet tensile modulus, g.p.d | 14 | 16 | (2) | 37 | 46 | 43 |
| Shrunken tensile modulus, g.p.d | 11 | 10 | (2) | 20 | 25 | 15 |
| Percent tensile recovery at 1% elongation | 80 | 81 | (2) | 85 | 88 | 83 |
| Percent work recovery at 1% elongation | 51 | 50 | (2) | 70 | 73 | 60 |
| Percent stress decay at 1% elongation | 27 | 26 | (2) | 17 | 16 | 23 |
| Yield stress in water at 21° C. g.p.d | .30 | .30 | (2) | 1.0 | 1.02 | .60 |
| Yield point in g./d. in air, at 70° F., 65% R.H | .69 | .68 | (2) | 1.20 | 1.22 | 1.0 |
| Yarn denier | 120 | 120 | 120 | 120 | 120 | 120 |
| Number filaments | 20 | 20 | 20 | 20 | 20 | 20 |

[1] Milliequivalents per kilogram of polymer. The data are based on the analysis of the polymer before melt blending and spinning.
[2] Typical values for nylon 6 control and the terminated nylon 6 fiber are, in general, equivalent.

TABLE 6

| Test variable | | | | Percent dye | Nylon 6,6 | Nylon 6, control [3] | Nylon 6, terminated | 10% polyester blend [3] | 30% polyester blend [3] | 40% polyester blend [3] | Electron affinity of dye |
|---|---|---|---|---|---|---|---|---|---|---|---|
| OCPR fiber viscosity | | | | | | | | | | | |
| Meq. amine end group [1] | | | | | .89 | 1.11 | 1.21 | 1.04 | .98 | .95 | |
| Meq. carboxyl end groups [2] | | | | | 27 | 50 | 9 | (3) | (3) | (3) | |
| | | | | | 106 | 45 | 66 | (3) | (3) | (3) | |
| Dye, class | Dye, identity employed [4] | Example | pH | | Percent dye strength vs. nylon 6 control | | | | | | |
| | 101X | 1 | 7.0 | .25 | 80 | 100 | 90 | 130 | 180 | 185 | 9.93 |
| | 101X | 2 | 10.0 | .25 | 70 | 90 | 80 | 115 | 170 | 175 | 9.93 |
| | 103X | 3 | 7.0 | .25 | 78 | 100 | 95 | 125 | 160 | 170 | 8.48 |
| | 103X | 4 | 10.0 | .25 | 70 | 85 | 85 | 115 | 155 | 165 | 8.48 |
| | Dispense orange 5 | 5 | 7.0 | .25 | 85 | 100 | 90 | 100 | 105 | 110 | 3.88 |
| | do | 6 | 10.0 | .25 | 70 | 90 | 80 | 95 | 100 | 105 | 3.88 |
| | 11420 disperse blue | 7 | 7.0 | .25 | 90 | 100 | 90 | 110 | 120 | 130 | 5.3 |
| | do | 8 | 10.0 | .25 | 80 | 85 | 80 | 100 | 115 | 120 | 5.3 |
| | Disperse orange 3 | 9 | 7.0 | .25 | 90 | 100 | 85 | 90 | 85 | 70 | 2.45 |
| | do | 10 | 10.0 | .25 | 80 | 85 | 75 | 80 | 80 | 75 | 2.45 |
| | 107X bri-ht scarlet | 11 | 7.0 | .25 | 85 | 100 | 90 | 90 | 85 | 90 | 3.0 |
| | do | 12 | 10.0 | .25 | 75 | 90 | 80 | 80 | 80 | 85 | 3.0 |
| | do | 13 | 7.0 | 1.0 | 90 | 100 | 80 | 70 | 60 | 50 | .28 |

[1] Milliequivalents of amine end groups per kilogram of fiber.
[2] Milliequivalents of carboxyl groups per kilogram of fiber.
[3] See Table 4 for yarn and polymer properties.
[4] See Table 2 for dye description of azo disperse dye with high electron affinity.

TABLE 7

| Ex. No. | Dye description | Dye class | Percent dye | pH | Electron affinity | Foot notes | 1 Nylon 6,6 | 2 Nylon 6, control | 3 Nylon 6, terminated | 4 10% polyester | 5 30% polyester | 6 40% polyester |
|---|---|---|---|---|---|---|---|---|---|---|---|---|
| 14 | Direct Blue 76 | 3 | .5 | 7.0 | | | 40 | 100 | 70 | 60 | 40 | 30. |
| 15 | Basic Blue 22 | 8 | .25 | 7.0 | | | 10 | 0 | 0 | 10 | 20 | 25. |
| 16 | Acid Blue 145 | 1 | .5 | 7.0 | | | 180 | 100 | 60 | 40 | 30 | 25. |
| 17 | Acid Brown 19 | 5 | 0.5 | 7.0 | | (1) | 30 | 100 [1] | 60 | 70 | 80 | 30. |
| 18 | do | 5 | 0.5 | 3.0 | | | 60 | 120 | 90 | 90 | 50 | 40. |
| 19 | do | 5 | 0.5 | 10.0 | | | 20 | 80 | 40 | 60 | 35 | 25. |
| 20 | Acid Blue 40 | 1 | 1.0 | 7.0 | | (2) | 45 | 100 [2] | 55 | 60 | 30 | 20. |
| 21 | Acid Red 207 | 7 | .25 | 4.5 | | | 40 | 100 | 45 | 50 | 20 | 15. |
| 22 | Acid Blue 40 | 1 | .25 | 7.0 | | | 20 | 40 | 20 | 25 | 15 | 10. |
| 23 | Acid Blue 40 plus 20 grams NaCl₂. | 1 | .25 | 7.0 | | | 30 | 60 | 30 | 50 | 60 | 70. |
| 24 | Acid Blue 40 [3] | 1 | 1.0 | 7.0 | | (3) | 30 | 70 | 45 | 40 | 30 | 20. |
| 25 | do | 1 | 1.0 | 10.0 | | | 30 | 50 | 40 | 40 | 20 | 15. |
| 26 | do | 1 | .25 | 9.0 | | (4) | 10 | 60 | 20 | 25 | 20 | 15. |
| 27 | Acid Black 53 | 5 | 1.0 | 7.0 | | | 60 | 250 | 130 | 150 | 115 | 95. |
| 28 | do | 5 | .25 | 7.0 | | (5) | 25 | 100 [5] | 60 | 80 | 60 | 50. |
| 29 | Acid Red 4 | 2 | .5 | 7.0 | | | Light Red 140. | Orange red 100. | Orange red 70. | Tan 80 | Tan 50 | Tan 40. |
| 30 | do | 2 | 2.0 | 7.0 | | | Red 100 | Red 100 | Red 60 | Scarlet 70 | Pink 50 | Pink 40. |
| 31 | Acid Orange 6 | 2 | .5 | 7.0 | | | Yellow 80 | Yellowish orange 100. | Yellowish orange 80. | Light orange 50. | Pink 20 | Pink 15. |
| 32 | Acid Yellow 38 | 2 | 1.0 | 6.0 | | | 80 | 100 | 70 | 90 | 70 | 60. |
| 33 | Acid Red 114 | 2 | .5 | 7.0 | | | 50 | 100 | 70 | 80 | 40 | 30. |
| 34 | Acid Green 25 | 1 | 1.0 | 7.0 | | | 60 | 100 | 60 | 80 | 50 | 40. |

[1] Control for Examples 18, 19.
[2] Control for Examples 22, 23, 24, 25.
[3] Plus 5 grams per liter dye bath colorless alkyl naphthalene monosulfonate.
[4] Add ammonia and drive it off at a boil to favor color deposition on rapid dyeing products.
[5] Control for run 28.

TABLE 8

Light fastness of azo disperse dyes applied to 30% polyester, 70% nylon Polyblend (all dyeings at 1%)

| Ex. No. | Light fastness, 30/70 Polyblend W.O. hours | Light fastness, 30/70 Polyblend Rating | Light fastness, nylon 6, W.O. hours | Dyestuff, see Table 2 | Electron affinity | Dye strength vs. nylon | Dye name | C.I. number |
|---|---|---|---|---|---|---|---|---|
| 35 | 20 | 4 | 10 | 101X | 9.9 | 180 | Burnt Orange | |
| 36 | 80 | 6 | 40 | | 2.0 | 80 | Disperse Yellow 3 | 11855 |
| 37 | 100 | 6-7 | 80 | 105X | 2.0 | 80 | Disperse Yellow 23 | |
| 38 | 40 | 5 | 40 | 103X | 8.48 | 160 | Scarlet | |

NOTE.—While the above light fastness ratings show little correlation with the apparent electron affinity of the dyestuff employed, it is a significant advantage that all fibers tested show a light fastness at least equal to or superior to the nylon control employed. (All tests in Table 7 were based on 1% dye based on weight of fabric.)

TABLE 9

| Ex. No. | Component A Example No., Table 7 | Component A Percent dye | Component A Dye class | Component B Example No., Table 6 | Component B Percent dye | Component electron affinity | Nylon 6,6 | Nylon 6, control | Nylon 6 terminated | 10% polyester | 30% polyester | 40% polyester | Polyester |
|---|---|---|---|---|---|---|---|---|---|---|---|---|---|
| 39 | 14 | .5 | [1] 3 | 1 | .25 | 9.9 | Light ivory. | Blue | Navy | Dark navy | Brown | Brown | Light orange. |
| 40 | 15 | .25 | 8 | 3 | .25 | 8.5 | Greenish yellow. | Yellow | Yellow | Greenish yellow. | Green | Green | Light yellow. |
| 41 | 21 | .25 | 7 | 7 | .25 | 5.3 | Violet | Reddish blue | Violet | Reddish violet | Blue | Blue | Blue stain. |
| 42 | 32 | .5 | 2 | 7 | .25 | 5.3 | Greenish yellow. | Yellow | Greenish yellow. | Olive green | Green | Green | Do. |

[1] See column 16, lines 48–51.

Examples 1–13, as shown in Table 6, illustrate the very large differences in a single color tone-on-tone depth obtained by introduction of a combination of nylon and polyblend fibers and illustrates the significant differences in shade and color obtainable in a one-dye bath operation. Most significantly, the increase in dye strength of the polyblends is altered substantially with increase in polyester content and even to far greater extent by the effect of high electron affinity dyes. The dye strength is proportional to the apparent electron affinity of the dye, that is, with a higher electron affinity azo disperse dye there is a significant increase in the amount of dye absorbed with an increase in the polyester content. This can be further influenced to a limited extent by changes in pH.

Table 7 illustrates the counter effect of a decrease in dye absorption with an increase in polyester content for direct, acid and premetallized dyes. Therein is illustrated a variety of ways of achieving multicolored fibers and/or tone-on-tone effects by means of selection of the dyes, where the lower dye absorption of polyblends vs. the nylons is employed. Thus, by careful selection of high electron affinity dyes and low absorption acid or premetallized dyes on the polyblend, very distinct and clear-cut separation of colors can be obtained between nylon and the polyblend fibers in a textile structure. This property is especially valuable for producing multicolored fabrics by dyeing in a single bath with the various dye types.

Since the PE–PA polyblend fibers dye deeply, with azo disperse dyes of high electron affinity at pH's up to as high as 10, this pH effect can be used as a means to further emphasize the shade and color differences between nylon and polyblends.

Examples 29, 30, 31 and 21 are all illustrations of the very large color differences which can be obtained for tone-on-tone dyeings.

Table 9, Examples 39–42, illustrates use of an azo dyestuff with high electron affinity with a second dyestuff such as acid premetallized dyestuff, as a component A, and a disperse dye, as component B. It can be observed in Table 9 that a complete change or separation of colors is obtained. The foregoing example illustrates that this invention provides for a fiber and a method of dyeing that fiber to obtain separate and multicolor effects between nylons and polyblends and thereby achieve multicolored patterns in fabrics. Because of the similarity of the hand of the polyblends and nylons, the fabric structures made from mixtures of these fibers and dyed in a common bath have along with a good color separation and change in colors similarity of hand and stress-strain characteristics which are of substantial utility.

What is claimed is:

1. A multicolored fabric comprising at least one polyester-polyamide blend fiber containing a uniform dispersion of 4 to 50 parts by weight of a fiber-forming polyester selected from the group consisting of polyethylene terephthalate and polyethylene isophthalate in a continuous body of 50 to 96 parts by weight of a fiber-forming polyamide selected from the group consisting of polyhexamethylene adipamide and polycaproamide per 100 parts by weight of total polyamide and polyester, said polyester-polyamide blend fiber being mechanically combined with a synthetic polyamide fiber to provide a fabric comprised of at least two different fibers, said fabric being dyed with an azo disperse dye having a solubility in water of less than 0.1 gram per 100 cc. of water and having an apparent electron affinity of greater than 3 electron volts to produce a dyed fabric having fibers dyed at different color levels.

2. The multicolored fabric of claim 1 wherein the azo disperse dye has an apparent electron affinity of 5.3 to 9.93 electron volts.

References Cited

UNITED STATES PATENTS

| | | | |
|---|---|---|---|
| 3,493,316 | 2/1970 | Ortheil et al. | 8—21 A |
| 3,369,057 | 2/1968 | Twilley | 260—857 |
| 3,635,653 | 1/1972 | Snider et al. | 8—21 |

FOREIGN PATENTS

| | | | |
|---|---|---|---|
| 999,878 | 7/1965 | Great Britain | 8—21 B |

LEON D. ROSDOL, Primary Examiner

T. J. HERBERT, Jr., Assistant Examiner

U.S. Cl. X.R.

8—21 R, 21 B, 21 C; 260—857

PO-1050
(5/69)

UNITED STATES PATENT OFFICE
CERTIFICATE OF CORRECTION

Patent No. 3,738,804 Dated June 12, 1973

Inventor(s) Orvill E. Snider, James E. Loughlin, Hans Ortheil

It is certified that error appears in the above-identified patent and that said Letters Patent are hereby corrected as shown below:

Column 1, line 7, after "S.C", insert --Assignors to Allied Chemical Corporation, New York, New York--.

Column 5, line 70, "myth" should be --Smyth--.

Table 2, Under "Dye Strength From Figure 1, Assigned Color No.", "127" should be --172--.

Table 2, Under Dye Color in PE-PA Blends, Assigned Color No.", "Oran e-----11005 Disperse Orange 3" should be --Orange-----11005 Disperse Orange 3--.

Column 18, line 14; "sleeve" should be --sleeves--.

Signed and sealed this 19th day of February 1974.

(SEAL)
Attest:

EDWARD M.FLETCHER,JR.
Attesting Officer

C. MARSHALL DANN
Commissioner of Patents